US011529617B2

(12) United States Patent
Snell

(10) Patent No.: US 11,529,617 B2
(45) Date of Patent: Dec. 20, 2022

(54) CATALYST SUPPORTS AND CATALYST SYSTEMS AND METHODS

(71) Applicant: Chevron Phillips Chemical Company LP, The Woodlands, TX (US)

(72) Inventor: Ryan W. Snell, Kingwood, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 39 days.

(21) Appl. No.: 16/991,540

(22) Filed: Aug. 12, 2020

(65) Prior Publication Data

US 2022/0048015 A1 Feb. 17, 2022

(51) Int. Cl.
| | | |
|---|---|---|
| B01J 29/60 | (2006.01) | |
| B01J 37/02 | (2006.01) | |
| B01J 37/04 | (2006.01) | |
| B01J 37/08 | (2006.01) | |
| B01J 37/20 | (2006.01) | |
| B01J 37/22 | (2006.01) | |
| C10G 35/06 | (2006.01) | |

(52) U.S. Cl.
CPC .......... *B01J 29/60* (2013.01); *B01J 37/0207* (2013.01); *B01J 37/0236* (2013.01); *B01J 37/04* (2013.01); *B01J 37/082* (2013.01); *B01J 37/20* (2013.01); *B01J 37/22* (2013.01); *C10G 35/065* (2013.01); *C10G 2400/30* (2013.01)

(58) Field of Classification Search
CPC .... B01J 29/60; B01J 37/0207; B01J 37/0236; B01J 37/04; B01J 37/082; B01J 37/20; B01J 37/22; C10G 35/065; C10G 2400/30
USPC ......................................................... 502/67
See application file for complete search history.

(56) References Cited

U.S. PATENT DOCUMENTS

| | | |
|---|---|---|
| 2,882,244 A | 4/1959 | Milton |
| 3,130,007 A | 4/1964 | Breck |
| 3,308,069 A | 3/1967 | Wadlinger |
| 3,415,736 A | 12/1968 | Ciric |
| 3,692,470 A | 9/1972 | Ciric |
| 3,702,886 A | 11/1972 | Argauer |
| 3,709,979 A | 1/1973 | Chu |
| 3,832,449 A | 8/1974 | Rosinski |
| RE28,341 E | 2/1975 | Wadlinger |
| 3,972,983 A | 8/1976 | Ciric |
| 4,016,245 A | 4/1977 | Plank |
| 4,076,842 A | 2/1978 | Plank |
| 4,104,320 A | 8/1978 | Bernard |
| RE29,948 E | 3/1979 | Dwyer |
| 4,241,036 A | 12/1980 | Flanigen |
| 4,310,440 A | 1/1982 | Wilson |
| 4,440,871 A | 4/1984 | Lok |
| 4,500,651 A | 2/1985 | Lok |
| 4,530,824 A | 7/1985 | Arika |
| 4,534,853 A | 8/1985 | Long |
| 4,544,539 A | 10/1985 | Wortel |
| 4,552,731 A | 11/1985 | Vaughan |
| 4,556,477 A | 12/1985 | Dwyer |
| 4,567,029 A | 1/1986 | Wilson |
| 4,585,747 A | 4/1986 | Valyocsik |
| 4,456,527 A | 5/1986 | Buss |
| 4,634,518 A | 1/1987 | Buss |
| 4,686,093 A | 8/1987 | Flanigen |
| 4,830,732 A | 5/1989 | Mohr |
| 4,859,422 A | 8/1989 | Qureshi |
| 4,861,743 A | 8/1989 | Flank |
| 4,910,006 A | 3/1990 | Zones |
| 4,963,337 A | 10/1990 | Zones |
| 4,973,785 A | 11/1990 | Lok |
| 5,053,373 A | 10/1991 | Zones |
| 5,106,801 A | 4/1992 | Zones |
| 5,158,665 A | 10/1992 | Miller |
| 5,200,377 A | 4/1993 | Zones |
| 5,202,014 A | 4/1993 | Zones |
| 5,254,514 A | 10/1993 | Nakagawa |
| 5,316,753 A | 5/1994 | Nakagawa |
| 5,437,855 A | 8/1995 | Valyocsik |
| 5,491,119 A | 2/1996 | Verduijn |
| 5,514,362 A | 5/1996 | Miller |
| 5,558,851 A | 9/1996 | Miller |
| 5,580,540 A | 12/1996 | Nakagawa |
| 5,591,421 A | 1/1997 | Zones |
| 5,624,657 A | 4/1997 | Vaughan |
| 6,190,539 B1 | 2/2001 | Holtermann |

(Continued)

FOREIGN PATENT DOCUMENTS

| | | |
|---|---|---|
| EP | 353915 A | 2/1990 |
| GB | 1117568 A | 6/1968 |

OTHER PUBLICATIONS

Besoukhanova, J. Chem. Soc., Faraday Trans. 1, 1981, 77, 1595-1604.
SNOWTEX®—Nissan Chemical Website (accessed Feb. 1, 2016).
International Search Report and the Written Opinion of the International Searching Authority in PCT/US2021/045575 dated Nov. 19, 2021, 11 pages.

*Primary Examiner* — Brian A McCaig
(74) *Attorney, Agent, or Firm* — Eversheds Sutherland (US) LLP

(57) ABSTRACT

Provided herein are catalyst supports, catalyst systems, and methods for making catalyst supports, catalyst systems, and performing chemical reactions with the catalyst systems. The catalyst supports include a zeolite and a binder including non-sodium counterions, such as ammonium counterions and/or potassium counterions. The catalyst systems include the catalyst supports and a catalytic material. The catalyst systems may be used to perform chemical reactions, including reactions of one or more hydrocarbons.

19 Claims, No Drawings

(56) References Cited

U.S. PATENT DOCUMENTS

| | | | |
|---|---|---|---|
| 6,207,042 B1 | 3/2001 | Holtermann et al. | |
| 7,902,105 B2 | 3/2011 | Khare | |
| 7,932,425 B2 | 4/2011 | Blessing | |
| 8,461,404 B2 | 6/2013 | Khare | |
| 8,835,341 B2 | 9/2014 | Khare | |
| 9,382,175 B2 | 7/2016 | Khare | |
| 10,226,761 B2 | 3/2019 | Snell | |
| 2013/0296625 A1 | 11/2013 | Ghosh | |
| 2014/0080696 A1* | 3/2014 | Ghosh | B01J 29/061 |
| | | | 502/64 |
| 2014/0316179 A1* | 10/2014 | Ghosh | B01J 37/08 |
| | | | 585/419 |
| 2018/0065115 A1 | 3/2018 | Alvez-Manoli | |

* cited by examiner

CATALYST SUPPORTS AND CATALYST SYSTEMS AND METHODS

BACKGROUND

Zeolite catalyst systems and catalyst supports can be useful to dehydrocyclize hydrocarbons to produce aromatic hydrocarbons. For example, catalyst systems containing large pore zeolites can be useful for reforming light petroleum naphtha (e.g., $C_6$-$C_8$) to benzene, toluene, xylenes, or combinations thereof.

Examples of such aromatization catalyst systems include catalyst supports containing silica bound large pore zeolites, platinum, and halides, such as chloride and fluoride.

Commercially available zeolite catalyst systems include the AROMAX® Catalyst, but its production can include many steps, which increases its production time and/or cost. A relatively lengthy production time can decrease manufacturing capacity, which can be especially disadvantageous as the use of AROMAX® Catalyst increases.

Currently, the processes for making AROMAX® Catalyst include several temperature controlled washes, followed by drying and calcination. These washes remove sodium from the catalyst that is readily removable, but tightly bound sodium counterions require harsh and/or destructive conditions. These washes are also batch processes, which are not readily adaptable to continuous production.

Due to the commercial importance of such catalyst systems, an ongoing need exists for improved zeolite catalyst systems and methods of making and using same, including methods that reduce the number of production steps, including wash steps, thereby decreasing production time and/or cost.

BRIEF SUMMARY

Provided herein are catalyst systems, catalyst supports, methods for making catalyst supports and catalyst systems, and methods for performing chemical reactions, including converting hydrocarbons to aromatics.

In one aspect, a process for making a catalyst support is provided, the process comprising contacting a zeolite and a binder to form a mixture, wherein the binder comprises a colloidal silica including potassium counterions, ammonium counterions, or a combination thereof, and substantially no sodium counterions; extruding and/or shaping the mixture to form a dimensioned mixture; drying the dimensioned mixture to form a substantially dried dimensioned mixture; and calcining the substantially dried dimensioned mixture to produce the catalyst support.

In one aspect, a process for making a catalyst system is provided, the process comprising adding one or more catalytic materials to an embodiment of the catalyst supports described herein to form a treated catalyst support. In some embodiments, the process for making a catalyst system includes adding one or more Group VII metals and one or more halides to a catalyst support to form a metalized and halided catalyst support; and drying and calcining the metalized and halided catalyst support to form the catalyst system.

In one aspect, a process for converting a hydrocarbon feed to aromatics is provided, the process comprising contacting an embodiment of the catalyst systems provided herein with one or more hydrocarbons in a reaction zone under aromatization conditions; recovering an aromatic product from the reaction zone; and purifying the aromatic product to produce benzene, toluene, paraxylene, orthoxylene, metaxylene, or a combination thereof. In some embodiments, the catalyst system is reduced prior to the contacting with the one or more hydrocarbons.

DETAILED DESCRIPTION

Provided herein are catalyst supports and catalyst systems, and methods for making catalyst supports and catalyst systems that include significantly fewer washing steps than the processes known in the art. It is believed that fewer washing steps are needed for the catalyst supports and catalyst systems provided herein, because the catalyst supports and catalyst systems do not include binders having a significant amount of sodium counterions. Instead, the catalyst supports and catalyst systems provided herein include binders having substantially no sodium counterions, which are also referred to herein as "non-sodium binders." The phrase "substantially no sodium counterions" refers to materials, such as binders, that include 0.20 wt. % or less of $Na_2O$, or 0.15 wt. % or less of sodium ions. The phrase "substantially free of sulfur and other metals known to be poisons for aromatization catalyst systems" refers to materials that include 500 ppm or less of each of sulfur and other metals known to be poisons for aromatization catalysts.

In embodiments, the processes for making a catalyst support include the following steps, which do not include the washing steps required in processes known in the art: contacting a zeolite and a binder to form a mixture, wherein the binder comprises a colloidal silica including potassium counterions, ammonium counterions, or a combination thereof, and substantially no sodium counterions; extruding and/or shaping the mixture to form a dimensioned mixture; drying the dimensioned mixture to form a substantially dried dimensioned mixture; and calcining the substantially dried dimensioned mixture to produce the catalyst support. The inclusion of one or more washing steps would materially affect the basic and novel properties of these embodiments. Non-limiting examples of additional steps or ingredients that would not materially affect the basic and novel properties of the invention include the following: one or more extrusion aids in the mixture; water in the mixture (other than the water provided by the colloidal silica); other additives in the mixture; common processing steps, such as stirring, transferring, and any step that is part of or related to contacting, extruding, shaping, drying, or calcining.

The term "zeolite", as used herein, generally refers to porous materials, such as hydrated, crystalline metal aluminosilicates, and/or molecular sieves of a non-zeolitic material.

The zeolites may exhibit a network of $SiO_4$ and $AlO_4$ tetrahedra in which aluminum and silicon atoms are cross-linked in a three-dimensional framework by sharing oxygen atoms. In the framework, the ratio of oxygen atoms to the total of aluminum and silicon atoms is equal to 2. The framework may exhibit a negative electrovalence that typically is balanced by the inclusion of cations within the crystal. The cations, as provided herein, may include alkali or alkaline earth ions.

Thus, zeolites include a group of natural or synthetic hydrated aluminosilicate minerals that contain alkali and alkaline metals. Zeolites may be characterized by a framework structure that encloses interconnected cavities occupied by ion-exchangeable large metal cations, such as potassium, and water molecules, thereby permitting reversible dehydration.

The actual formula of the zeolite may vary without changing the crystalline structure. In an embodiment, the mol ratio of silicon to aluminum (Si/Al) in the zeolite may vary from about 1.0 to about 3.5.

In an embodiment, the catalyst supports provided herein comprise a large-pore zeolite. The term "large-pore zeolite", as used herein, refers to a zeolite having an effective pore diameter of from about 6 Angstroms (Å) to about 15 Å, alternatively from about 7 Å to about 9 Å. Large pore crystalline zeolites suitable for use in this disclosure include, without limitation, ZSM-3, ZSM-4, ZSM-10, ZSM-12, ZSM-20, zeolite beta, zeolite omega, zeolite L, zeolite X, zeolite Y, REY, USY, RE-USY, mordenite, LZ-210, LZ-210-M, LZ-210-T, LZ-210-A, SSZ-24, SSZ-25, SSZ-26, SSZ-31, SSZ-33, SSZ-35, SSZ-37, SSZ-41, SSZ-42, SSZ-44, and MCM-58. ZSM-3 is described in U.S. Pat. No. 3,415,736; ZSM-4 is described in UK 1,117,568; ZSM-10 is described in U.S. Pat. No. 3,692,470; ZSM-12 is described in U.S. Pat. No. 3,832,449; ZSM-20 is described in U.S. Pat. No. 3,972,983; Zeolite beta is described in U.S. Pat. No. Re. 28,341 (of original U.S. Pat. No. 3,308,069); Zeolite omega is described in U.S. Pat. No. 4,241,036; Zeolite L is described in U.S. Pat. No. 3,216,789; Zeolite X is described in U.S. Pat. No. 2,882,244; Zeolite Y is described in U.S. Pat. No. 3,130,007; LZ-210, LZ-210M, LZ-210-T, LZ-210-A and mixtures thereof are described in U.S. Pat. No. 4,534,853; SSZ-24 is described in U.S. Pat. No. 4,834,977; SSZ-26 is described in U.S. Pat. No. 4,910,006; SSZ-31 is described in U.S. Pat. No. 5,106,801; SSZ-33 is described in U.S. Pat. No. 4,963,337; SSZ-35 is described in U.S. Pat. No. 5,316,753; SSZ-37 is described in U.S. Pat. No. 5,254,514; SSZ-41 is described in U.S. Pat. No. 5,591,421; SSZ-42 is described in U.S. Pat. No. 5,653,956; SSZ-44 is described in U.S. Pat. No. 5,580,540; MCM-58 is described in U.S. Pat. No. 5,437,855. The entire contents of all these patents and patent applications are incorporated herein by reference. In an embodiment, the large pore zeolite has an isotypic framework structure. In another embodiment, the catalyst support comprises L-zeolite.

In embodiments, the catalyst supports and catalyst systems provided herein include an L-zeolite or a zeolite having an L-zeolite-type channel structure and size, such as ECR-2, which is described in U.S. Pat. No. 4,552,731, or ECR-31, which is described in U.S. Pat. No. 5,624,657 (Vaughan). In one embodiment, the zeolite is a monofunctional, non-acidic L-zeolite with potassium cations (K L-zeolite). Acidity in the L-zeolite generally leads to poor performance in catalytic reforming. Examples of useful L-zeolites include those described in U.S. Pat. No. 3,216,789 (Breck), U.S. Pat. No. 4,552,731 (Vaughan), U.S. Pat. No. 4,544,539 (Wortel), U.S. Pat. No. 5,491,119 (Verduijn) and U.S. Pat. No. 4,530,824 (assigned to Tosoh Ltd.). The entire contents of all these patents are incorporated herein by reference. For these non-acidic zeolites, potassium is a preferred cation; a preferred catalyst system comprises K L-zeolite.

L-type zeolites are a sub-group of zeolites. The designations LTL zeolite or Linde type L zeolite also refer to this same sub-group of zeolitic catalyst systems. Typical L-type zeolites contain mol ratios of oxides in accordance with at least one of the following formulas:

$$\mathrm{M}_{2/n}\mathrm{O}\cdot\mathrm{Al}_2\mathrm{O}_3\cdot x\mathrm{SiO}_2\cdot y\mathrm{H}_2\mathrm{O}, \text{ or}$$

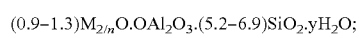

$$(0.9-1.3)\mathrm{M}_{2/n}\mathrm{O}\cdot\mathrm{Al}_2\mathrm{O}_3\cdot(5.2-6.9)\mathrm{SiO}_2\cdot y\mathrm{H}_2\mathrm{O};$$

wherein "M" designates at least one exchangeable cation, such as barium, calcium, cerium, lithium, magnesium, potassium, sodium, strontium, and zinc, as well as non-metallic cations like hydronium and ammonium ions, which may be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite. L-zeolite, its X-ray diffraction pattern, its properties, and methods for its preparation are described in detail in U.S. Pat. No. 3,216,789, the content of which is hereby incorporated by reference. In an embodiment, the catalyst support comprises L-zeolite wherein M is potassium, also referred to as KL-zeolite.

In embodiments, the zeolite used in the catalyst systems and catalyst supports provided herein may have an intermediate pore size. Useful intermediate pore zeolites are exemplified by ZSM-5, ZSM-11, ZSM-22, ZSM-23, ZSM-35; ZSM-48, ZSM-57, SUZ-4, SSZ-23; SSZ-25; SSZ-28, SSZ-32, and SSZ-36. ZSM-5 is described in U.S. Pat. No. Re. 29,948 (of original U.S. Pat. No. 3,702,886); ZSM-11 is described in U.S. Pat. No. 3,709,979; ZSM-22 is described in U.S. Pat. No. 4,556,477; ZSM-23 is described in U.S. Pat. No. 4,076,842. ZSM-35 is described in U.S. Pat. No. 4,016,245; ZSM-48 is described in U.S. Pat. No. 4,585,747; SUZ-4 is described in EP 353,915; SSZ-23 is described in U.S. Pat. No. 4,859,422; SSZ-25 is described in U.S. Pat. Nos. 4,827,667 and 5,202,014; SSZ-28 is described in U.S. Pat. No. 5,200,377; SSZ-32 is described in U.S. Pat. No. 5,053,373; and SSZ-36 is described in U.S. Pat. No. 6,218,591. The entire contents of all these patents and patent applications are incorporated herein by reference. The term "intermediate pore zeolite", as used herein, refers to a zeolite having an effective pore diameter of from about 5 Angstroms (Å) to about 6 Å, alternatively from about 5.3 Å to about 5.7 Å.

In addition to silicon, the useful zeolites herein can contain one or more framework elements other than, or in addition to, aluminum, e.g., the borosilicate zeolites. Also, the zeolites can be modified to alter their as-synthesized framework silica to alumina ratio.

In embodiments, the zeolite is a non-zeolitic molecular sieve with intermediate or large pores. Non-zeolitic molecular sieves are microporous compositions that are formed from [AlO$_2$] and [PO$_2$] tetrahedra and have electrovalently neutral frameworks. See U.S. Pat. No. 4,861,743. Also included among the useful zeolites are materials of similar structure or behavior, e.g., crystalline metallophosphates such as those described in U.S. Pat. No. 4,440,871. Non-zeolitic molecular sieves include aluminophosphates (AlPO$_4$) as described for example in U.S. Pat. No. 4,310,440, metalloaluminophosphates, as described in U.S. Pat. Nos. 4,500,651; 4,567,029; 4,544,143; and 4,686,093, and nonmetal substituted aluminophosphates, as described in U.S. Pat. No. 4,973,785.

In embodiments, the catalyst systems and catalyst supports provided herein include intermediate pore silicoaluminophosphates (SAPO's) as the non-zeolitic molecular sieve component. Intermediate pore SAPO's include SAPO-11, SAPO-31, SAPO-41 and SM-3. U.S. Pat. No. 4,440,871 describes SAPO's generally and SAPO-11, SAPO-31, and SAPO-41 specifically. The preparation of SM-3 and its unique characteristics are described in U.S. Pat. No. 5,158,665. All these patents are incorporated herein by reference.

Binder

The catalyst supports provided herein may comprise a binder. The binder may bind together one or more zeolite materials. The catalyst may also include a binder, such as a refractory oxide, e.g., silica, alumina, chlorided alumina, or silica-alumina. The binder, in embodiments, is a colloidal silica that includes primarily non-sodium counterions. The non-sodium counterions may include one or more types of non-sodium counterions. For example, in particular embodiments, the binder is a colloidal silica including potassium counterions, ammonium counterions, or a combination thereof.

In an embodiment, the colloidal silica comprises particles having a diameter of from about 5 nm to about 30 nm, alternatively, from about 8 nm to about 25.

The colloidal silica may be provided as an aqueous solution having (i) a pH of from about 9.0 to about 10.5, (ii) a viscosity of equal to or less than about 20 mPa·s at 25° C., alternatively from about 1 to about 20 mPa·s at 25° C., or (iii) a combination thereof.

The binder may additionally comprise synthetic or naturally occurring zeolites; alumina; clays, such as montmorillonite and kaolin; the refractory oxides of metals of Groups IVA and IVB of the Periodic Table of the Elements; oxides of silicon, titanium, zirconium or combinations thereof; or combinations thereof.

The catalyst supports provided herein generally may be formed by contacting a zeolite and a binder to form a mixture.

The mixture, on a dry basis, may contain from about 85 wt. % to about 95 wt. % zeolite, alternatively from about 80 wt. % to about 90 wt. %, alternatively from about 75 wt. % to about 90 wt. % zeolite, alternatively from about 50 wt. % to about 95 wt. % zeolite.

The mixture may contain zeolite and a binder combined in a weight ratio of from about 1:99 to about 99:1, alternatively from about 90:10 to about 80:20, alternatively from about 92:8 to about 82:18 on a dry basis.

The mixture may be formed into a suitable shape, for example by shaping and/or extrusion. The shaping and/or extrusion may form what is referred to herein as a "dimensioned mixture." In an embodiment, the mixture will contain sufficient water to retain a particular shape. Water may be added separately to the mixture or sufficient water may be present in the colloidal silica. The amount of water required to retain a particular shape may be varied and selected according to ordinary skill in the art.

In an embodiment, the mixture is extruded and may contain up to about 50 grams of water per about 100 grams of extrudate.

The mixture generally may be shaped and/or extruded into a dimensioned mixture having any suitable shape. In an embodiment, the mixture is shaped and/or extruded into particles having desired dimensions. Methods for shaping and/or extruding particles are well known in the art, and include, for example, extrusion, spray drying, pelletizing, agglomerization and the like. In a particular embodiment, the dimensioned mixture is an extrudate, for example as described in U.S. Pat. Nos. 5,558,851 and 5,514,362, each of which are incorporated herein in their entirety.

In an embodiment, the mixture further comprises an extrusion aid. An extrusion aid may function to improve the rheology of the mixture. This improvement in the rheology of the mixture may function to improve flow of the mixture through an extrusion die. Improved flow through the extrusion die may permit easier equipment start-up, smoother extrusion, faster processing, lower extrusion pressures, improved product appearance, or a combination thereof. In one embodiment, the extrusion aid comprises cellulose derivatives, ethylene glycol, stearic acid, or combinations thereof. In a particular embodiment, the extrusion aid comprises a cellulose ether, such as methylcellulose, carboxymethylcellulose, ethylhydroxyethylcellulose, hydroxyethylcellulose, hydroxypropylcellulose, methylhydroxyethylcellulose, methylhydroxypropylcellulose, or combinations thereof. Extrusion aids, and their effective amounts and/or methods of incorporation into the mixture may be varied and selected according to ordinary skill in the art. Hereafter, the shaped and/or extruded mixture, including a mixture exiting a die, will be referred to as a "dimensioned mixture."

Excess water from the dimensioned mixture may be removed by drying to form a dried dimensioned mixture prior to further processing. Conventional methods for drying wet solids can be used to dry the dimensioned mixture, and may include, for example, drying in air or an inert gas, such as nitrogen or helium. The air or inert gas may be circulating, moving, or static. Drying temperatures may range from about 200° F. to about 400° F., alternatively from about 200° F. to about 300° F., alternatively from about 225° F. to about 275° F. Drying times may range from equal to or greater than about 1 hour, alternatively from about 1 hour to about 10 hours, alternatively from about 2 hours to about 5 hours.

In an embodiment, the dried dimensioned mixture is calcined to form a catalyst support. Calcination temperatures may range from about 500° F. to about 1500° F., alternatively from about 700° F. to about 1100° F., alternatively from about 850° F. to about 1100° F. Calcination times may range from about 0.5 to about 5 hours, alternatively from about 0.5 to about 1.5 hours.

In embodiments, the calcination may be carried out in an oxygen containing atmosphere having a dry air flow. As used herein, "dry" air refers to air having a dew point of less than about −40° F.

In embodiments, the calcined dimensioned mixture is a catalyst support. In one embodiment, the calcined dimensioned mixture is a silica bound zeolite catalyst support. The catalyst supports may be directly used in a catalyst system preparation, as provided herein, or may be further processed according to the following description.

The catalyst supports having been processed as described herein may be further processed to add one or more catalytic materials to the catalyst supports to form treated catalyst supports. In an embodiment, the one or more catalytic materials is capable of catalyzing the conversion of hydrocarbons to aromatics. In a particular embodiment, the catalytic compound is capable of catalyzing the conversion of hydrocarbons to aromatics, and comprises one or more metals to form a metalized catalyst support. In a particular embodiment, the catalytic compound is capable of catalyzing the conversion of hydrocarbons to aromatics, and comprises one or more metals and one or more halides to form a metalized and halided catalyst support.

The metal may be added to the catalyst support by employing a variety of known and conventional techniques, e.g., ion-exchange, incipient wetness, pore fill, impregnation, etc. In an embodiment, the metal is added to the catalyst support by impregnation with a metal-containing solution to form the metalized catalyst support. The metal-containing solution can include one or more of the metals disclosed herein.

In an embodiment, the catalyst support is impregnated with one or more Group VIII metals; alternatively, Pt, Pd, Rh, Ir, Ru, Os, or combinations thereof; alternatively, platinum. In one embodiment, the metal comprises platinum that is added to the support via contact with a metal-containing solution containing at least one platinum-containing compound forming the metalized catalyst support. Examples of suitable platinum-containing compounds for contact with the support include, without limitation, platinum compounds that form positively charged platinum complex ions in solution, such as, for example, platinum salts, such as chlorides and nitrates; platinum complexes with amines; or combinations thereof. The platinum-containing compound can be any platinum-containing compound including, but not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum (II) chloride, tetraammineplatinum (II) nitrate, or combinations thereof. In an embodiment, the platinum source is tetraammine platinum (II) chloride (TAPC). The amount of platinum on the metalized catalyst support may range from about 0.1 to about 5 wt. %, alternatively from about 0.1 to about 3 wt. %, alternatively from about 0.3 to about 1.8 wt. %.

To the Group VIII metals, one or more non-platinum group metals can also be added, such as tin, gallium, thulium, indium, or metals of Group VIIB, such as rhenium. Examples include Pt/Sn, Pt/Pd, Pt/Ni, and Pt/Re. These metals can be readily introduced into the catalyst supports provided herein employing a variety of known and conventional techniques, e.g., ion-exchange, incipient wetness, pore fill, impregnation, etc.

In embodiments, the Group VIII metal, e.g., platinum, is uniformly dispersed on the metalized catalyst support or catalyst system. This may be achieved by incorporating the Group VII metal in a manner that results in excellent and uniform dispersion. The incipient wetness impregnation method is one example of such a technique.

In an embodiment, one or more halides are added to the catalyst support. In one embodiment, one or more halides are added to the catalyst support by contact with a halide-containing compound to form a halided catalyst support. In another embodiment, one or more halides are added to the metalized catalyst support by contact with a halide-containing compound to form a metalized and halided catalyst support. The halides, including two or more different halides, may be added to the catalyst support separately; alternatively, the halides, including two or more different halides, may be added to the catalyst support at the same time, e.g., substantially simultaneously.

In embodiments, one or more halides may be added to a catalyst support during the previously described addition of one or more metals to the catalyst support; alternatively, one or more halides may be added to a catalyst support during a separate step, such as a separate step that may occur before or after an addition of one or more metals to the catalyst support, to form a metalized and halided catalyst support.

Examples of suitable halides include, without limitation, fluoride, chloride, bromide, iodide, or combinations thereof. Such halides may be introduced as an ammonium halide compound. The ammonium halide compound may comprise one or more compounds represented by the formula $N(R)_4X$, wherein X is a halide, and wherein R represents a hydrogen or a substituted or unsubstituted carbon chain molecule having 1-20 carbons, wherein each R may be the same or different. In an embodiment, R is selected from the group consisting of hydrogen, methyl, ethyl, propyl, butyl, and combinations thereof, more specifically hydrogen and/or methyl.

Examples of suitable ammonium halide compounds represented by the formula $N(R)_4X$ include ammonium chloride (AC), ammonium fluoride (AF), and tetraalkylammonium halides, such as tetramethylammonium chloride (TMAC), tetramethylammonium fluoride (TMAF), tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, or combinations thereof.

In an embodiment, the catalyst system comprises chloride present in an amount of from about 0.1 to about 5 wt. %, alternatively from about 0.3 to about 3 wt. %, alternatively from about 0.6 to about 2.8 wt. %. In an embodiment, the catalyst system comprises fluoride present in an amount of from about 0.1 to about 5 wt. %, alternatively from about 0.3 to about 3 wt. %, alternatively from about 0.6 to about 2.8 wt. %.

In an embodiment, the catalyst system comprises both chloride and fluoride, which may be present in a Cl:F ratio of from about 1:10 to about 10:1, alternatively from about 1:5 to about 5:1 alternatively from about 1:2 to about 2:1. Once the catalyst support has been contacted with halogens and metal it is hereinafter referred to as a halided, metallized catalyst support. In an embodiment, the halided, metallized catalyst support is allowed to set for several hours prior to additional processing. In an embodiment, the halided, metallized catalyst support is allowed to set for about 1 to about 24 hours, alternatively for about 2 to about 8 hours, alternatively for about 3 to about 6 hours.

Following the preparation of the halided; metallized; or metalized and halided catalyst supports by contact with one or more catalytic materials, such as a metal and/or one or more halides, the treated catalyst support may then be further processed as described herein. The treated catalyst support may be processed to remove undesirable compounds remaining from the contacting steps, for example, by drying to remove compounds and/or heating to decompose compounds. In an embodiment, the halided; metallized; or metalized and halided catalyst support is dried, and calcined as described previously to form a catalyst system.

The treated catalyst supports, for example, may be dried after contacting one or more catalytic materials. The drying temperature may range from about 100° F. to about 300° F., alternatively from about 150° F. to about 250° F., alternatively from about 200° F. to about 220° F. The drying time may range from about 0.1 to about 6 hours, alternatively from about 0.2 to about 4 hours, alternatively from about 0.2 to about 3 hours. The catalyst supports may be dried using any equipment known to one of ordinary skill in the art for drying under the disclosed conditions. For example, the catalyst supports may be dried using a standard rotary evaporator operating at greater than about 100° F., and under a pressure of about 20 to about 30 inches of mercury.

The dried catalyst supports may be calcined. The calcining temperature may range from about 400° F. to about 900° F., alternatively from about 500° F. to about 700° F., alternatively from about 550° F. to about 600° F. The calcining time may range from about 0.5 to about 5 hours, alternatively from about 0.5 to about 2.5 hours. Upon completion of processing, the dried and calcined catalyst systems may be employed as an aromatization catalyst in a suitable chemical reaction and process.

In embodiments, the catalyst systems provided herein are used as a catalyst in a reactor system.

According to one embodiment, the reactor system hosts a catalytic reforming process, e.g., low sulfur reforming using a bound, halided Pt L-zeolite catalyst system. Catalytic reforming is well known. For example, it is described in the book, *Catalytic Reforming*, by D. M. Little, PennWell Books (1985), which is incorporated herein by reference in its entirety. Preferred reforming process conditions include a temperature between 700 and 1100° F., more preferably between 800 and 1050° F.; a pressure between 0 and 400 psig, more preferably between 15 and 150 psig; a recycle hydrogen rate sufficient to yield a hydrogen to hydrocarbon mol ratio for the feed to the reforming reaction zone between 0.1 and 20, more preferably between 0.5 and 10 and most preferably between 1.5 and 6; and a liquid hourly space velocity (LHSV) for the hydrocarbon feed over the catalyst system of between 0.1 and 10 hr$^{-1}$, more preferably between 0.5 and 5 hr$^{-1}$. Reforming may produce hydrogen. Thus, additional hydrogen may not be needed except when the catalyst system is reduced upon startup, and when the feed is first introduced. Once reforming is underway, part of the hydrogen that is produced is preferably recycled over the catalyst system.

In one embodiment, the reactor system is an aromatization reactor system. The aromatization reactor system may comprise at least one aromatization reactor and its corresponding processing equipment.

As used herein, the terms "aromatization," "aromatizing" and "reforming" refer to the treatment of a hydrocarbon feed to provide an aromatic enriched product, which in one embodiment is a product whose aromatics content is greater than that of the feed. Typically, one or more components of the feed undergo one or more reforming reactions to produce aromatics. Some of the hydrocarbon reactions that occur during the aromatization operation include the dehydrogenation of cyclohexanes to aromatics, dehydroisomerization of alkylcyclopentanes to aromatics, dehydrocyclization of acyclic hydrocarbons to aromatics, or combinations thereof. A number of other reactions also occur, including the dealkylation of alkylbenzenes, isomerization of paraffins, hydrocracking reactions that produce light gaseous hydrocarbons, e.g., methane, ethane, propane, or butane, or combinations thereof.

In embodiments, the aromatization reaction occurs under process conditions that thermodynamically favor the dehydrocyclization reaction and limit undesirable hydrocracking reactions. In particular embodiments, the pressures are from about 20 pounds per square inch gauge (psig) to about 500 psig, alternatively from about 30 psig to about 300 psig. In some embodiments, the molar ratio of hydrogen to hydrocarbons is from about 0.1:1 to about 20:1, alternatively from about 0.5:1 to about 6:1. The operating temperatures may include reactor inlet temperatures from about 700° F. to about 1050° F., alternatively from about 900° F. to about 1025° F. Finally, the liquid hourly space velocity for the hydrocarbon feed over the catalyst system may be from about 0.1 to about 10, alternatively from about 0.5 to about 2.5.

In embodiments, the catalyst systems provided herein may contact hydrocarbons by any means known in the art. The hydrocarbons may be a hydrocarbon feed. The composition of the hydrocarbon feed may be a consideration when designing catalytic aromatization systems. In an embodiment, the hydrocarbon feed comprises non-aromatic hydrocarbons containing at least six carbon atoms. In a particular embodiment, the feed to the aromatization system is a mixture of hydrocarbons comprising $C_6$ to $C_8$ hydrocarbons containing up to about 10 wt. % and alternatively up to about 15 wt. % of $C_5$ and lighter hydrocarbons ($C_5^-$) and containing up to about 10 wt. % of $C_9$ and heavier hydrocarbons ($C_9^+$). Not wishing to be bound by any particular theory, it is believed that such low levels of $C_9^+$ and $C_5^-$ hydrocarbons may maximize the yield of high value aromatics. In some embodiments, an optimal hydrocarbon feed maximizes the percentage of $C_6$ hydrocarbons. Such a feed can be achieved by separating a hydrocarbon feedstock, such as a full range naphtha, into a light hydrocarbon feed fraction and a heavy hydrocarbon feed fraction, and using the light fraction.

In embodiments, the hydrocarbon feed is a naphtha feed. The naphtha feed may be a light hydrocarbon, with a boiling range of about 70° F. to about 450° F. The naphtha feed may contain aliphatic hydrocarbons, naphthenic hydrocarbons, paraffinic hydrocarbons, or a combination thereof. These aliphatic and naphthenic hydrocarbons may be converted, at least in part, to aromatics in certain embodiments of the aromatization reactor system containing one or more of the catalyst systems provided herein.

In embodiments, the feed to the reforming processes provided herein is or is derived from naphtha that contains at least some acyclic hydrocarbons or alkylcyclopentanes. Particularly preferred feeds include raffinates from an aromatics extraction unit, such as a Udex raffinate; $C_6$-$C_9$, $C_7$-$C_9$, $C_8$-$C_9$, $C_6$-$C_8$, $C_7$-$C_8$, $C_7$ and $C_8$ fractions, especially fractions containing mixtures of five and six-member saturated rings. Preferably, these fractions are obtained by distilling wider boiling range naphtha, or by distilling a raffinate from an aromatics extraction unit. The feed can be substantially free of sulfur, nitrogen, metals and other known poisons in these embodiments. These poisons can be removed by first using conventional hydrofining techniques, then using sorbents to remove the remaining sulfur compounds and water. In a preferred embodiment, the hydrocarbons contacting the catalyst system are substantially dry and free of sulfur, i.e. sulfur levels are preferably maintained below about 500 ppm, preferably below about 500 ppb, preferably below about 100 ppb, and more preferably below about 25 ppb. Sulfur removal systems are well known in the ultra-low sulfur reforming art. They include mild reforming using hydrogen and Pt on alumina, followed by sorption. Sorbents are well known in the art; examples include K on alumina, nickel oxide, and manganese oxide.

In embodiments, the hydrocarbon feed is substantially free of sulfur, nitrogen, metals, and other known poisons for catalyst systems. In an embodiment, the hydrocarbon feed contains less than about 500 ppb of sulfur. If present, such poisons can be removed using methods known to those skilled in the art. In some embodiments, the hydrocarbon feed can be purified by first using conventional hydrofining techniques, then using sorbents to remove the remaining poisons.

While catalytic aromatization typically refers to the conversion of naphtha, other feedstocks can be contacted as well with embodiments of the catalyst systems herein to provide an aromatics enriched product. Therefore, while the conversion of naphtha is one embodiment, the present disclosure can be useful for activating catalyst systems for the conversion or aromatization of a variety of feedstocks, such as paraffinic hydrocarbons, olefinic hydrocarbons, acetylenic hydrocarbons, cyclic paraffin hydrocarbons, cyclic olefin hydrocarbons, and mixtures thereof, and saturated hydrocarbons.

The hydrocarbon feed can be contacted with the catalyst system in a fixed bed system, a moving bed system, a fluidized system, or a batch system. Either a fixed bed system or a moving bed system is preferred. In a fixed bed system, the preheated feed is passed into at least one reactor that contains a fixed bed of the catalyst system. The flow of the feed can be upward, downward or radial. The effluent from the catalytic reforming reaction zone can be separated into the desired streams or fractions. Benzene, toluene, and $C_8$ aromatic streams can be recovered using conventional techniques, such as distillation and extraction.

In some embodiments, the catalyst system is reduced prior to contacting with the one or more hydrocarbons In an embodiment, the catalyst systems provided herein are used for the production of an aromatic product, which may then be recovered from a reaction zone and processed subsequently to produce benzene, toluene, paraxylene, orthoxylene, metaxylene, or a combination thereof. For example, the catalyst systems provided herein may be used in a process comprising aromatizing a wide boiling range naphtha in a reformer, for example, a continuous catalytic reformer or semi-regenerative reformer, followed by distillation and extraction of the reformer effluent into the aromatics fractions. The aromatics fractions may comprise benzene, toluene, and the xylenes consisting of paraxylene, orthoxylene, and metaxylene.

These aromatic materials have various uses in industry. For example, the xylene isomers orthoxylene, metaxylene, and paraxylene are important chemical intermediates. Orthoxylene may be oxidized to make phthalic anhydride, which is used to make phthalate-based plasticizers among other things. Metaxylene may be oxidized to make isophthalic acid, which is used in unsaturated polyester resins. Orthoxylene and metaxylene may be isomerized to paraxylene. Paraxylene may be oxidized to make terephthalic acid, which in turn is used to make polymers, such as polytrimethyleneterephthalate, polybutyleneterephthalate (PBT), and polyethyleneterephthalate (PET). PET is one of the largest volume polymers in the world and is used to make PET plastics (e.g., PET bottles). It is also used to make polyester fiber, which in turn is used to make clothes and other fabrics.

In embodiments, the catalyst systems provided herein are used as part of a process to produce benzene, which may be hydrogenated to form a hydrogenation product, such as, for example, cyclohexane. Benzene, for instance, may be hydrogenated in a process involving a high-purity benzene feed and purified hydrogen. The conversion of benzene to cyclohexane is stoichiometric. Cyclohexane may be used to produce intermediates for nylons, such as, for example, nylon 6 and nylon 66. Nylon 6 may be made by polymerizing caprolactam, which is derived from the nitration of cyclohexane. Nylon 66 may be made by polymerizing equal molar quantities of adipic acid and hexamethylene diamine (HMDA). Adipic acid may be made by a two-step air and nitric acid oxidation of cyclohexane. The adipic acid can be converted to HMDA by the reduction of adiponitrile (an intermediate). Adipic acid produced from cyclohexane also may be used to manufacture esters for plasticizers and synthetic lubricants, as well as produce polyurethanes (synthetic leather).

In an embodiment, the catalyst systems provided herein catalyze the production of benzene, which may be further alkylated to produce ethylbenzene, which is a raw material for the production of styrene. For example, benzene may be combined, typically in molar excess, with a suitable alkylating reagent having from 2 to 54 carbon atoms, such as olefins (e.g., ethylene, propylene), halogenated alkanes, or mixtures thereof. In a particular embodiment, at least a portion of the benzene may be alkylated with ethylene to produce ethylbenzene, which may be optionally followed by dehydrogenation of the ethylbenzene to styrene. In another embodiment, at least a portion of the benzene may be alkylated with propylene to produce cumene.

The catalyst systems provided herein, in certain embodiments, display improvements in catalytic performance consistent with the higher levels of catalytically active materials. Improvements in catalytic performance may be measured by any means known to one of ordinary skill in the art. When used as catalysts in an aromatization reaction, the catalyst systems of this disclosure may display a reduced Temperature at Start of Run (TSOR), a decreased fouling rate, higher liquid yield, an extended catalytic life, or combinations thereof. Additional measures of improved catalytic performance would be apparent to one of ordinary skill in the art.

In embodiments, the catalyst systems provided herein may be used in a variety of catalytic conversion processes, including those that use bound, zeolite catalysts to convert feed to products. Preferred hydrocarbon conversion processes include dehydrocyclization, especially dehydrocyclization of $C_6$ to $C_8$ paraffins to aromatics; catalytic reforming; non-oxidative and oxidative dehydrogenation of hydrocarbons to olefins and dienes; dehydrogenation of ethylbenzene to styrene and/or dehydrogenation of isobutane to isobutylene; conversion of light hydrocarbons to aromatics; transalkylation of toluene to benzene and xylenes; hydrodealkylation of alkylaromatics to aromatics; alkylation of aromatics to alkylaromatics; production of fuels and chemicals from syngas ($H_2$ and CO); steam reforming of hydrocarbons to $H_2$ and CO; production of phenylamine from aniline; methanol alkylation of toluene to xylenes; and dehydrogenation of isopropyl alcohol to acetone. More preferred hydrocarbon conversion processes include dehydrocyclization, catalytic reforming, dehydrogenation, isomerization, hydrodealkylation, and conversion of light hydrocarbon to aromatics, e.g., Cyclar-type processing. These processes, their commercial startup conditions and their useful range of process operating conditions are all well known to those skilled in the art. These processes can be carried out in a single reactor or in a series of reactors, at least one of which contains one or more of the catalyst systems provided herein.

In embodiments, the catalyst systems used in the processes provided herein are monofunctional. In these embodiments, they do not have the acid function of conventional reforming catalysts. In contrast, conventional reforming catalysts are bifunctional, with an acid and a metal function. Examples of monofunctional catalyst systems include platinum on L-zeolite, as disclosed in U.S. Pat. No. 4,104,320 to Bernard et al.; platinum on L-zeolite. Alternatively, the L-zeolite can be exchanged with an alkaline earth metal, such as barium, as disclosed in U.S. Pat. No. 4,634,518 to Buss and Hughes; and platinum on L-zeolite as disclosed in U.S. Pat. No. 4,456,527 to Buss, Field and Robinson. The entire contents of all these patents are incorporated herein by reference The term "non-acidic" is understood by those skilled in this area of art, particularly by the contrast between monofunctional (non-acidic) reforming catalyst systems and bifunctional (acidic) reforming catalysts.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Effectiveness of Washings

A reference sample was made using a potassium L-zeolite and a binder containing sodium counterions. The KL-zeolite of this example contained roughly 0.22 wt. % $Na_2O$. The binder used for the reference sample of this example was a colloidal silica containing 0.43 wt. % $Na_2O$. The KL-zeolite and binder containing sodium counterions were mixed, dried, and calcined as explained herein to create a catalyst support including 83 wt. % of the zeolite and 17 wt. % binder. Since the colloidal silica had a 30 wt. % concentration of silica, this sample required about 57 g of colloidal silica per 100 g catalyst support.

In order to determine how much sodium was removed from the binder and from the zeolite during washing steps, a second catalyst support was made using a colloidal silica having substantially no sodium counterions (estimated at 0 wt. %).

Both catalyst supports were then washed, and the wash water from both catalyst supports was analyzed. All washes [1] used 2.5 mass DI $H_2O$/mass of catalyst support, [2] were repeated three times, [3] performed at 100° F., and [4] lasted 20 minutes per wash. As depicted at Table 1, approximately half of the sodium removed in the wash came from the binder. As this was approximately the same percentage of the overall sodium originating from the binder in the reference support, it suggested that sodium from the binder and the KL-zeolite were washed away with approximately the same ease.

TABLE 1

Sodium removal during washing of reference support and support made with non-sodium binder.

| Binder | Wash #1 Na (ppmw) | Wash #2 Na (ppmw) | Wash #3 Na (ppmw) | Cumulative Na (ppmw) | % of nominal Na removed | Moles Na/g Catalyst nominally left |
|---|---|---|---|---|---|---|
| Reference | 195 | 68 | 45 | 308 | 24 | $10.7 \times 10^{-5}$ |
| Non-Na (ST-SK) | 111 | 25 | 13 | 149 | 21 | $4.6 \times 10^{-5}$ |
| Na from Binder | 43 | 63 | 71 | 52 | | |

The total amount of sodium removed was about 24% of the original amount present in the support. These results demonstrated, for this example, that approximately the same percentage of sodium was removed regardless of how much sodium was present in the catalyst support. Based on the analysis of the wash water and the nominal amount of sodium initially present in both catalyst supports of this example, the concentration of sodium left after the washing of each support was calculated.

As shown at Table 1, the catalyst support made with the non-sodium binder had approximately half the sodium content of the reference support. The nominal sodium content remaining in the reference catalyst support after the washings was greater than the amount of sodium initially present in the KL-zeolite ($6.2 \times 10^{-5}$ moles Na/g catalyst). Therefore, the washing steps can be eliminated, as described herein, for the catalyst support containing a non-sodium binder.

The catalyst supports, catalyst systems, and methods provided herein are further described by the following non-limiting embodiments.

Embodiment 1. A process for making a catalyst support, the process comprising, consisting essentially of, or consisting of:
contacting a zeolite and a binder to form a mixture, wherein the binder comprises a colloidal silica having substantially no sodium counterions.

Embodiment 2. A process for making a catalyst support, the process comprising, consisting essentially of, or consisting of:
contacting a zeolite and a binder to form a mixture, wherein the binder comprises a colloidal silica (i) having substantially no sodium counterions, and (ii) including potassium counterions, ammonium counterions, or a combination thereof.

Embodiment 3. The process of embodiment 1 or 2, wherein the mixture further comprises water.

Embodiment 4. The process of any one of embodiments 1-3, further comprising extruding and/or shaping the mixture to form a dimensioned mixture.

Embodiment 5. The process of any one of embodiments 1-4, further comprising drying the dimensioned mixture to produce a dried dimensioned mixture.

Embodiment 6. The process of any one of embodiments 1-5, further comprising calcining the dimensioned mixture or a dried dimensioned mixture to produce the catalyst support.

Embodiment 7. A process for making a catalyst support, the process comprising, consisting essentially of, or consisting of:
contacting a zeolite and a binder to form a mixture, wherein the binder comprises a colloidal silica having substantially no sodium counterions;
extruding and/or shaping the mixture to form a dimensioned mixture;
drying the dimensioned mixture to form a substantially dried dimensioned mixture; and
calcining the substantially dried dimensioned mixture to produce the catalyst support.

Embodiment 8. A process for making a catalyst support, the process comprising, consisting essentially of, or consisting of:
contacting a zeolite and a binder to form a mixture, wherein the binder comprises a colloidal silica including potassium counterions, ammonium counterions, or a combination thereof, and substantially no sodium counterions;
extruding and/or shaping the mixture to form a dimensioned mixture;
drying the dimensioned mixture to form a substantially dried dimensioned mixture; and
calcining the substantially dried dimensioned mixture to produce the catalyst support.

Embodiment 9. A process for making a catalyst system, the process comprising:

(i) adding one or more catalytic materials to the catalyst support of any one of embodiments 1-8 to form a treated catalyst support; or (ii) adding one or more Group VII metals and one or more halides to the catalyst support of any one of embodiments 1-8 to form a treated catalyst support that is a metalized and halide catalyst support.

Embodiment 10. The process of embodiment 9, wherein the one or more catalytic materials is capable of catalyzing the conversion of hydrocarbons to aromatics.

Embodiment 11. The process of embodiment 9 or 10, further comprising drying the treated catalyst support.

Embodiment 12. The process of any one of embodiment 11, wherein drying the treated catalyst support removes one or more undesirable compounds from the catalyst support.

Embodiment 13. The process of any one of embodiments 9-12, wherein the drying is performed at a drying temperature ranging from about 100° F. to about 300° F., alternatively from about 150° F. to about 250° F., alternatively from about 200° F. to about 220° F.

Embodiment 14. The process of any one of embodiments 9-13, wherein the drying time ranges from about 0.1 to about 6 hours, alternatively from about 0.2 to about 4 hours, alternatively from about 0.2 to about 3 hours.

Embodiment 15. The process of any one of embodiments 9-14, wherein the drying comprises using a standard rotary evaporator operating at greater than about 100° F. and under a pressure of about 20 to about 30 inches of mercury.

Embodiment 16. The process of any one of embodiments 11-15, further comprising calcining the treated catalyst support to form the catalyst system.

Embodiment 17. The process of any one of embodiments 6-16, wherein the calcining temperature ranges from about 400° F. to about 900° F., alternatively from about 500° F. to about 700° F., alternatively from about 550° F. to about 600° F.

Embodiment 18. The process of any one of embodiments 6-17, wherein the calcining time ranges from about 0.5 to about 5 hours, alternatively from about 0.5 to about 2.5 hours.

Embodiment 19. A process for converting a hydrocarbon feed to aromatics, the process comprising:

contacting the catalyst system of any one of embodiments 9-19 with one or more hydrocarbons in a reaction zone under aromatization conditions;

recovering an aromatic product from the reaction zone; and purifying the aromatic product to produce benzene, toluene, paraxylene, orthoxylene, metaxylene, or a combination thereof.

Embodiment 20. The process of embodiment 19, wherein the catalyst system is reduced prior to the contacting with the one or more hydrocarbons.

Embodiment 21. The process of embodiment 19 or 20, wherein the one or more hydrocarbons comprise $C_6$ to $C_8$ hydrocarbons up to about 10 wt. % and alternatively up to about 15 wt. % of $C_5$ and lighter hydrocarbons ($C_5^-$) and containing up to about 10 wt. % of $C_9$ and heavier hydrocarbons ($C_9^+$).

Embodiment 22. The process of embodiment 19 or 20, wherein the one or more hydrocarbons comprise a naphtha feed.

Embodiment 23. The process of embodiment 22, wherein the naphtha feed has a boiling range of about 70° F. to about 450° F., and/or comprises aliphatic hydrocarbons, naphthenic hydrocarbons, paraffinic hydrocarbons, or a combination thereof.

Embodiment 24. The process of any one of embodiments 19-23, wherein the one or more hydrocarbons comprises paraffinic hydrocarbons, olefinic hydrocarbons, acetylenic hydrocarbons, cyclic paraffin hydrocarbons, cyclic olefin hydrocarbons, or a combination thereof.

Embodiment 25. The process of any one of embodiments 19-24, wherein the one or more hydrocarbons are substantially free of sulfur and other metals known to be poisons for aromatization catalyst systems.

Embodiment 26. The process of embodiment 25, wherein the one or more hydrocarbons contain less than about 500 ppb of sulfur.

Embodiment 27. The process of any one of embodiments 1-26, wherein the mixture further comprises an extrusion aid.

Embodiment 28. The process of embodiment 27, wherein the extrusion aid is selected from a cellulose derivative, ethylene glycol, stearic acid, or a combination thereof.

Embodiment 29. The process of embodiment 28, wherein the extrusion aid comprises a cellulose ether.

Embodiment 30. The process of embodiment 29, wherein the cellulose ether comprises ethylcellulose, carboxymethylcellulose, ethylhydroxyethylcellulose, hydroxyethylcellulose, hydroxypropylcellulose, methylhydroxyethylcellulose, methylhydroxypropylcellulose, or a combination thereof.

Embodiment 31. The process of any one of embodiments 4-30, wherein the mixture further comprises water in an amount sufficient to permit the mixture to retain a desired shape upon shaping and/or extrusion.

Embodiment 32. The process of any one of claim 31, wherein the mixture comprises up to about 50 grams of water per about 100 grams of extrudate, the extrudate consisting of the components of the mixture other than water, such as the zeolite and the silica of the colloidal silica.

Embodiment 33. The process of any one of embodiments 1-32, wherein the zeolite comprises a large pore zeolite.

Embodiment 34. The process of embodiment 33, wherein the large pore zeolite has an effective pore diameter of from about 6 Angstroms (Å) to about 15 Å, or, alternatively, from about 7 Å to about 9 Å.

Embodiment 35. The process of any one of embodiments 1-34, wherein the zeolite comprises a hydrated, crystalline metal aluminosilicate.

Embodiment 36. The process of embodiment 35, wherein silicon and aluminum are present in the zeolite at a mol ratio (Si/Al) of from about 1.0 to about 3.5.

Embodiment 37. The process of any one of embodiments 33-36, wherein the zeolite comprises a network of $SiO_4$ and $AlO_4$ tetrahedra in which aluminum and silicon atoms are crosslinked in a three-dimensional framework by sharing oxygen atoms.

Embodiment 38. The process of embodiment 37, wherein the ratio of oxygen atoms to the total of aluminum and silicon atoms is equal to 2.

Embodiment 39. The process of any one of embodiments 1-32, wherein the zeolite is selected from L-zeolite, X-zeolite, Y-zeolite, omega zeolite, beta zeolite, ZSM-3, ZSM-4, ZSM-5, ZSM-10, ZSM-11, ZSM-12, ZSM-20, ZSM-22, ZSM-23, ZSM-35, ZSM-48, ZSM-57, REY, USY, RE-USY, LZ-210, LZ-210-A, LZ-210-M, LZ-210-T, SSZ-23, SSZ-24, SSZ-25, SSZ-26, SSZ-28, SSZ-32, SSZ-36, SSZ-26, SSZ-31, SSZ-33, SSZ-35, SSZ-37, SSZ-41, SSZ-42, SSZ-44, MCM-58, SUZ-4, mordenite, faujasite, or a combination thereof Embodiment 40. The process of any one of embodiments 1-32, wherein the zeolite is an intermediate pore zeolite.

Embodiment 41. The process of embodiment 40, wherein the intermediate pore zeolite has an effective pore diameter of from about 5 Angstroms (Å) to about 6 Å.
Embodiment 42. The process of embodiment 40, wherein the intermediate pore zeolite is selected from ZSM-5, ZSM-11, ZSM-22, ZSM-23, ZSM-35; ZSM-48, ZSM-57, SUZ-4, SSZ-23, SSZ-25; SSZ-28, SSZ-32, SSZ-36, or a combination thereof.
Embodiment 43. The process of any one of embodiments 1-32, wherein the zeolite comprises a non-zeolitic molecular sieve with intermediate or large pores.
Embodiment 44. The process of embodiment 43, wherein the non-zeolitic molecular sieve comprises aluminophosphates (AlPO$_4$), metalloaluminophosphate, nonmetal substituted aluminophosphates, silicoaluminophosphates (SAPO's), or a combination thereof.
Embodiment 45. The process of embodiment 44, wherein the SAPO is selected from SAPO-11, SAPO-31, SAPO-41, SM-3, or a combination thereof.
Embodiment 46. The process of embodiment 39, wherein the L-zeolite comprises mol ratios of oxides in accordance with at least one of the following formulas:

$$M_{2/n}O.Al_2O_3.xSiO_2.yH_2O, \text{ or}$$

$$(0.9-1.3)M_{2/n}O.Al_2O_3.(5.2-6.9)SiO_2.yH_2O;$$

wherein
1) "M" designates at least one exchangeable cation, such as barium, calcium, cerium, lithium, magnesium, potassium, sodium, strontium, and zinc, as well as non-metallic cations like hydronium and ammonium ions, which may be replaced by other exchangeable cations without causing a substantial alteration of the basic crystal structure of the L-type zeolite;
2) "n" in the formula represents the valence of "M";
3) "x" is 2 or greater; and
4) "y" is the number of water molecules contained in the channels or interconnected voids with the zeolite.
Embodiment 47. The process of any one of embodiments 1-46, wherein the mixture comprises the zeolite in an amount of from about 50% to about 95% by weight of the mixture on a dry basis.
Embodiment 48. The process of any one of embodiments 1-46, wherein the mixture comprises the zeolite in an amount of from about 75% to about 95% by weight of the mixture on a dry basis.
Embodiment 49. The process of any one of embodiments 1-46, wherein the mixture comprises the zeolite in an amount of from about 80% to about 90% by weight of the mixture on a dry basis.
Embodiment 50. The process of any one of embodiments 1-46, wherein the zeolite and the binder are present in the mixture in a weight ratio of from about 1:99 to about 99:1, alternatively from about 90:10 to about 85:15, alternatively from about 92:8 to about 82:18 all on a dry basis.
Embodiment 51. The process of any one of embodiments 1-46, wherein the zeolite and the binder are present in the mixture in a weight ratio of greater than about 80:20 (zeolite:binder).
Embodiment 52. The process of any one of embodiments 1-46, wherein the zeolite and the binder are present in the mixture in a weight ratio of equal to or less than about 80:20 (zeolite:binder).
Embodiment 53. The process of any one of embodiments 1-52, wherein the colloidal silica comprises an aqueous solution of silica having a vol % of silica of from about 20% to about 40%, a pH of from about 9.0 to about 10.5, and a viscosity of equal to or less than about 20 mPa·s at 25° C., alternatively from about 1 to about 20 mPa·s at 25° C.
Embodiment 54. The process of any one of embodiments 1-53, wherein the binder includes one or more of the following: synthetic or naturally occurring zeolites; alumina; clays, such as montmorillonite and/or kaolin; the refractory oxides of metals of Groups IVA and IVB of the Periodic Table of the Elements; oxides of silicon, titanium, zirconium or combinations thereof; or combinations thereof.
Embodiment 55. The process of any one of embodiments 4-54, wherein the dimensioned mixture is in the form of particles.
Embodiment 56. The process of any one of embodiments 4-55, wherein shaping and/or extruding the mixture comprises extrusion, spray drying, pelletizing, agglomerization, or a combination thereof.
Embodiment 57. The process of any one of embodiments 5-56, wherein drying comprises subjecting the dimensioned mixture to a temperature of from about 200° F. to about 400° F., alternatively from about 200° F. to about 300° F., alternatively from about 225° F. to about 275° F.
Embodiment 58. The process of any one of embodiments 5-57, wherein drying comprises subjecting the dimensioned mixture to a temperature of from about 200° F. to about 400° F., alternatively from about 200° F. to about 300° F., alternatively from about 225° F. to about 275° F., for a time from equal to or greater than about 1 hour, alternatively from about 1 hour to about 10 hours, alternatively from about 2 hours to about 5 hours.
Embodiment 59. The process of any one of embodiments 6-58, wherein calcining comprises subjecting the dimensioned mixture or substantially dried dimensioned mixture to a calcination temperature ranging from about 500° F. to about 1500° F., alternatively from about 700° F. to about 1100° F., alternatively from about 850° F. to about 1100° F.
Embodiment 60. The process of any one of embodiments 6-58, wherein calcining comprises subjecting the dimensioned mixture or substantially dried dimensioned mixture to a calcination temperature ranging from about 500° F. to about 1500° F., alternatively from about 700° F. to about 1100° F., alternatively from about 850° F. to about 1100° F., for a time ranging from about 0.5 to about 5 hours, alternatively from about 0.5 to about 1.5 hours.
Embodiment 61. The process of any one of embodiments 9-60, wherein the one or more catalytic materials comprise one or more Group VII metals, one or more halides, or a combination thereof.
Embodiment 62. The process of embodiment 61, wherein adding one or more catalytic materials to the catalyst support comprises adding a metal catalytic compound via ion-exchange, incipient wetness, pore fill, impregnation, or a combination thereof.
Embodiment 63. The process of any one of embodiments 9-62, wherein adding one or more catalytic materials to the catalyst support comprises adding a metal catalytic compound by impregnation with a metal-containing solution.
Embodiment 64. The process of any one of embodiments 9-63, wherein the one or more catalytic materials comprise Pt, Pd, Rh, Jr, Ru, Os, or combinations thereof; alternatively, platinum.
Embodiment 65. The process of embodiment 63 or 64, wherein the one or more catalytic materials comprises platinum that is added to the support via contact with a metal-containing solution containing at least one platinum-containing compound.
Embodiment 66. The process of embodiment 65, wherein the at least one platinum-containing compound comprises platinum compounds that form positively charged platinum complex ions in solution, such as, for example, platinum salts such as chlorides and nitrates; platinum complexes with amines; or combinations thereof.

Embodiment 67. The process of embodiment 65, wherein the at least one platinum-containing compound comprises ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, tetraammineplatinum (II) nitrate, or combinations thereof.

Embodiment 68. The process of any one of embodiments 64-67, wherein the amount of platinum in the catalyst system ranges from about 0.1 to about 5 wt. %, alternatively from about 0.1 to about 3 wt. %, alternatively from about 0.3 to about 1.8 wt. %.

Embodiment 69. The process of any one of embodiments 61-68, wherein the one or more halides comprise fluoride, chloride, bromide, iodide, or combinations thereof.

Embodiment 70. The process of any one of embodiments 9-69, wherein adding one or more catalytic materials to the catalyst support comprises contacting the catalyst support with an ammonium halide compound.

Embodiment 71. The process of embodiment 70, wherein the ammonium halide compound comprises one or more compounds represented by the following formula:

$$N(R)_4X,$$

wherein X is a halide, and wherein R represents a hydrogen or a substituted or unsubstituted carbon chain molecule having 1-20 carbons, wherein each R may be the same or different. In an embodiment, R is selected from the group consisting of methyl, ethyl, propyl, butyl, and combinations thereof, more specifically methyl.

Embodiment 72. The process of embodiment 70, wherein the ammonium halide compound is selected from ammonium chloride (AC), ammonium fluoride (AF), and tetraalkylammonium halides, such as tetramethylammonium chloride (TMAC), tetramethylammonium fluoride (TMAF), tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, or a combination thereof.

Embodiment 73, The process of any one of embodiments 61-72, wherein the catalyst system comprises chloride present in an amount of from about 0.1 to about 5 wt. %, alternatively from about 0.1 to about 3 wt. %, alternatively from about 0.3 to about 1.8 wt. %.

Embodiment 74. The process of any one of embodiments 61-72, wherein the catalyst system comprises fluoride present in an amount of from about 0.1 to about 5 wt. %, alternatively from about 0.1 to about 3 wt. %, alternatively from about 0.3 to about 1.8 wt. %.

Embodiment 75. The process of any one of embodiments 61-74, wherein the catalyst system comprises both chloride and fluoride.

Embodiment 76. The process of embodiment 75, wherein the chloride and fluoride are present in a Cl:F ratio of from about 1:10 to about 10:1, alternatively from about 1:5 to about 5:1 alternatively from about 1:2 to about 2:1.

Embodiment 77. The process of any one of embodiments 19-76, wherein the aromatization conditions comprise a pressure from about 20 pounds per square inch gauge (psig) to about 500 psig, alternatively from about 25 psig to about 300 psig.

Embodiment 78. The process of embodiment 19-77, wherein the aromatization conditions comprise a molar ratio of hydrogen to hydrocarbons of from about 0.1:1 to about 20:1, alternatively from about 0.5:1 to about 6:1.

Embodiment 79. The process of any one of embodiments 19-78, wherein the aromatization conditions comprise reactor inlet temperatures of from about 700° F. to about 1050° F., alternatively from about 900° F. to about 1025° F.

Embodiment 80. The process of any one of embodiments 19-79, wherein the aromatization conditions comprise a liquid hourly space velocity for the one or more hydrocarbons over the catalyst system of from about 0.1 to about 10, alternatively from about 0.5 to about 2.5.

Embodiment 81. The process of any one of embodiments 1-80, wherein the process is performed in the absence of a washing step.

I claim:

1. A process for making a catalyst system, the process comprising:
   contacting a zeolite and a binder to form a mixture, wherein the zeolite comprises a non-zeolitic molecular sieve with intermediate or large pores, and wherein the binder comprises a colloidal silica including potassium counterions, ammonium counterions, or a combination thereof, and substantially no sodium counterions;
   extruding and/or shaping the mixture to form a dimensioned mixture;
   drying the dimensioned mixture to form a substantially dried dimensioned mixture;
   calcining the substantially dried dimensioned mixture to produce a catalyst support;
   adding one or more Group VIII metals and one or more halides to the catalyst support to form a metalized and halided catalyst support; and
   drying and calcining the metalized and halided catalyst support to form the catalyst system.

2. The process of claim 1, wherein the mixture further comprises an extrusion aid.

3. The process of claim 2, wherein the extrusion aid comprises a cellulose ether.

4. The process of claim 3, wherein the cellulose ether comprises ethylcellulose, carboxymethylcellulose, ethylhydroxyethylcellulose, hydroxyethylcellulose, hydroxypropylcellulose, methylhydroxyethylcellulose, methylhydroxypropylcellulose, or a combination thereof.

5. The process of claim 1, wherein the mixture further comprises water in an amount sufficient to permit the mixture to form the dimensioned mixture upon the extruding and/or shaping.

6. The process of claim 1, wherein the zeolite has large pores.

7. The process of claim 6, wherein the zeolite has an effective pore diameter of from about 6 Angstroms (Å) to about 15 Å.

8. The process of claim 1, wherein the zeolite further comprises a material selected from L-zeolite, X-zeolite, Y-zeolite, omega zeolite, beta zeolite, ZSM-3, ZSM-4, ZSM-5, ZSM-10, ZSM-11, ZSM-12, ZSM-20, ZSM-22, ZSM-23, ZSM-35, ZSM-48, ZSM-57, REY, USY, RE-USY, LZ-210, LZ-210-A, LZ-210-M, LZ-210-T, SSZ-23, SSZ-24, SSZ-25, SSZ-26, SSZ-28, SSZ-32, SSZ-36, SSZ-26, SSZ-31, SSZ-33, SSZ-35, SSZ-37, SSZ-41, SSZ-42, SSZ-44, MCM-58, SUZ-4, mordenite, faujasite, or a combination thereof.

9. The process of claim 1, wherein the zeolite has intermediate pores.

10. The process of claim 9, wherein the zeolite has an effective pore diameter of from about 5 Angstroms (Å) to about 6 Å.

11. The process of claim 1, wherein the zeolite further comprises an intermediate pore zeolite selected from ZSM-5, ZSM-11, ZSM-22, ZSM-23, ZSM-35; ZSM-48, ZSM-57, SUZ-4, SSZ-23, SSZ-25; SSZ-28, SSZ-32, SSZ-36, or a combination thereof.

12. The process of claim 1, wherein the adding of the one or more Group VIII metals and the one or more halides comprises adding the one or more Group VIII metals and the one or more halides via ion-exchange, incipient wetness, pore fill, impregnation, or a combination thereof.

13. The process of claim 1, wherein the adding of the one or more Group VIII metals comprises impregnation with a metal-containing solution.

14. A process for converting a hydrocarbon feed to aromatics, the process comprising:
  contacting the catalyst system of claim 1 with one or more hydrocarbons in a reaction zone under aromatization conditions;
  recovering an aromatic product from the reaction zone; and
  purifying the aromatic product to produce benzene, toluene, paraxylene, orthoxylene, metaxylene, or a combination thereof.

15. The process of claim 14, wherein the catalyst system is reduced prior to the contacting of the catalyst system with the one or more hydrocarbons.

16. The process of claim 14, wherein the one or more hydrocarbons comprises a naphtha feed.

17. The process of claim 14, wherein the one or more hydrocarbons comprise acyclic paraffinic hydrocarbons, acyclic olefinic hydrocarbons, acetylenic hydrocarbons, cyclic paraffin hydrocarbons, cyclic olefin hydrocarbons, or a combination thereof.

18. The process of claim 1, wherein the one or more Group VIII metals are selected from the group consisting of platinum, palladium, rhodium, iridium, ruthenium, and osmium.

19. The process of claim 1, further comprising adding one or more non-platinum group metals to the catalyst support, wherein the one or more non-platinum group metals are selected from the group consisting of tin, gallium, thulium, indium, and a metal of Group VII.

* * * * *